(12) United States Patent
Orange et al.

(10) Patent No.: US 8,696,280 B2
(45) Date of Patent: Apr. 15, 2014

(54) QUICK TWIST CONNECTOR FOR MARINE BATTERY

(75) Inventors: Charles M. Orange, Nashville, TN (US); Steven A. Eller, Goodlettsville, TN (US)

(73) Assignee: SPC International, LLC, Nashville, TN (US)

( * ) Notice: Subject to any disclaimer, the term of this patent is extended or adjusted under 35 U.S.C. 154(b) by 428 days.

(21) Appl. No.: 11/366,938

(22) Filed: Mar. 2, 2006

(65) Prior Publication Data

US 2007/0207007 A1    Sep. 6, 2007

(51) Int. Cl.
*F16B 37/08*    (2006.01)
*F16B 37/16*    (2006.01)

(52) U.S. Cl.
USPC ............................ 411/267; 411/270; 411/433

(58) Field of Classification Search
USPC .................. 411/265–270, 432, 437, 918, 433
See application file for complete search history.

(56) References Cited

U.S. PATENT DOCUMENTS

| | | | | |
|---|---|---|---|---|
| 750,675 | A * | 1/1904 | Michelin | 411/432 |
| 1,440,205 | A * | 12/1922 | Beebe | 68/253 R |
| 2,367,480 | A * | 1/1945 | Beswick | 411/433 |
| 2,814,324 | A * | 11/1957 | Shur | 411/267 |
| 3,352,341 | A * | 11/1967 | Schertz | 411/270 |
| 3,695,139 | A | 10/1972 | Howe | |
| 4,378,187 | A | 3/1983 | Fullerton | |
| 4,923,349 | A | 5/1990 | Logsdon | |
| 4,930,961 | A * | 6/1990 | Weis | 411/266 |
| 5,000,640 | A | 3/1991 | Haas | |
| 5,081,811 | A * | 1/1992 | Sasaki | 52/223.13 |
| 5,139,381 | A * | 8/1992 | Lubreski et al. | 411/433 |
| 5,324,150 | A * | 6/1994 | Fullerton | 411/433 |
| 5,340,252 | A | 8/1994 | Weddendorf | |
| 5,468,105 | A * | 11/1995 | Iwamoto | 411/433 |
| 5,598,612 | A | 2/1997 | Sheldon | |
| 5,613,816 | A * | 3/1997 | Cabahug | 411/433 |
| 5,733,084 | A * | 3/1998 | Fullerton | 411/267 |
| 5,800,108 | A * | 9/1998 | Cabahug | 411/433 |
| 5,902,085 | A | 5/1999 | Yuta | |
| 5,941,539 | A | 8/1999 | Pratt | |
| 6,347,782 | B1 | 2/2002 | Gill | |
| 6,361,260 | B1 * | 3/2002 | Schirrmacher | 411/433 |
| 6,460,901 | B2 | 10/2002 | Rochelle | |
| 6,478,334 | B1 * | 11/2002 | Desmarais et al. | 280/805 |
| 6,666,637 | B1 | 12/2003 | Sun | |
| 6,712,574 | B1 | 3/2004 | Roopnarine | |
| 6,799,930 | B1 | 10/2004 | More | |
| 6,860,693 | B2 | 3/2005 | Jones | |
| 6,974,291 | B2 * | 12/2005 | Li | 411/437 |
| 7,198,236 | B2 * | 4/2007 | Warner | 248/125.8 |
| 8,162,558 | B2 * | 4/2012 | Warner | 403/109.1 |

* cited by examiner

*Primary Examiner* — Victor Batson
*Assistant Examiner* — Tyler Johnson
(74) *Attorney, Agent, or Firm* — Miller & Martin PLLC

(57) ABSTRACT

The invention provides a split nut connector in which spaced apart nut sections enable the connector to slide over a threaded battery terminal post until contact is made with the battery cable lug and the threaded nut sections are pushed into engagement with the threaded battery terminal post enabling effective tightening of the nut with a minimal amount of rotation in the fastening direction.

20 Claims, 8 Drawing Sheets

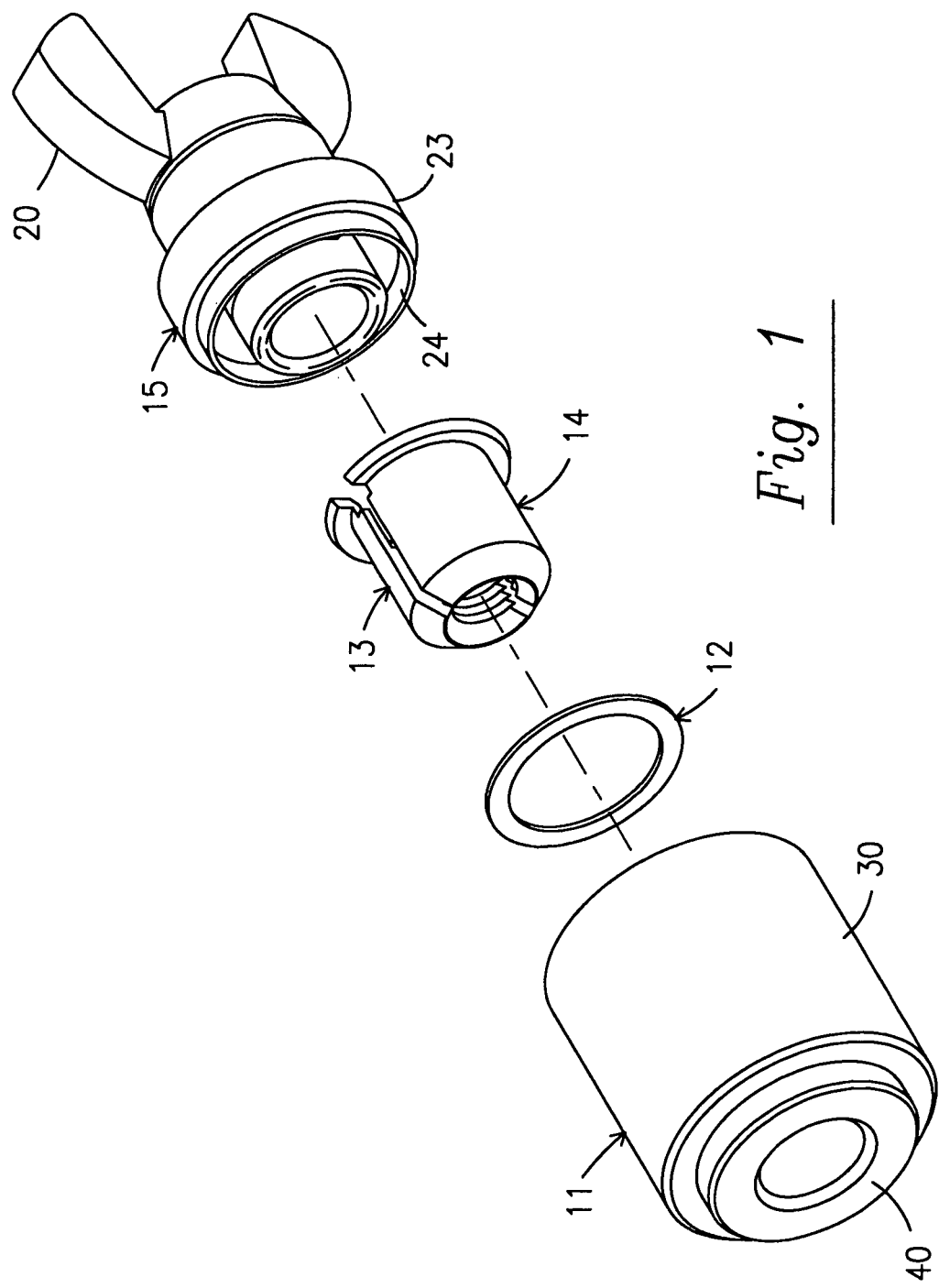

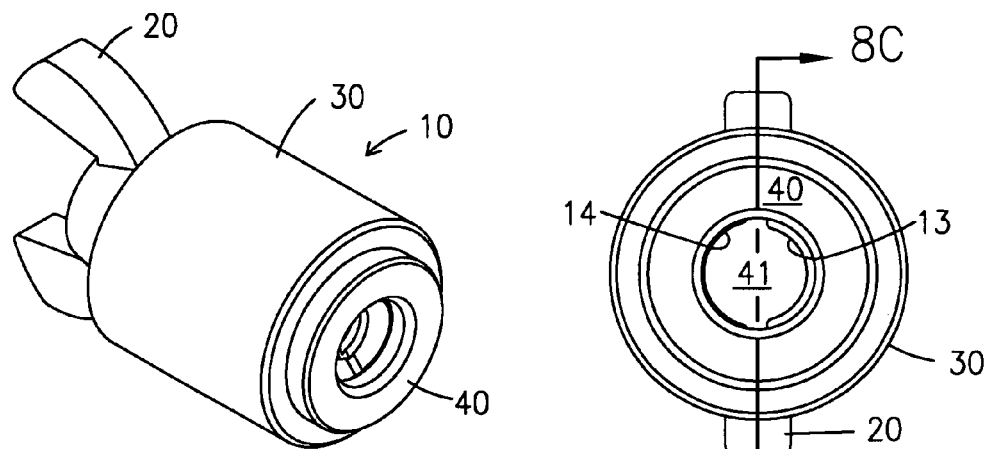
*Fig. 8A*
*Fig. 8B*
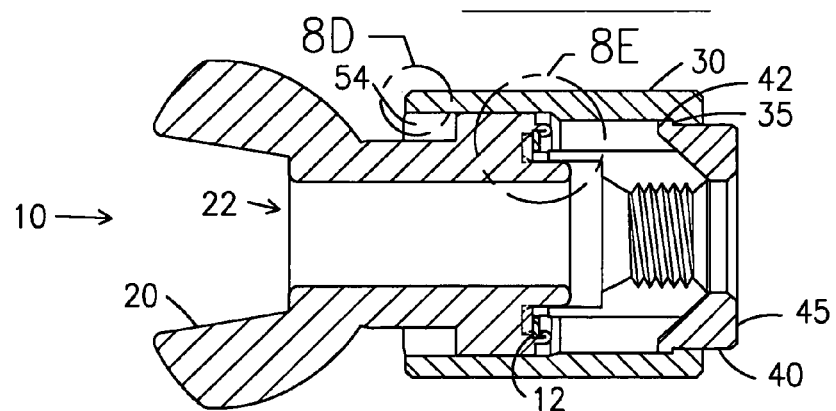
*Fig. 8C*
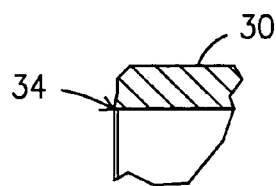
*Fig. 8D*
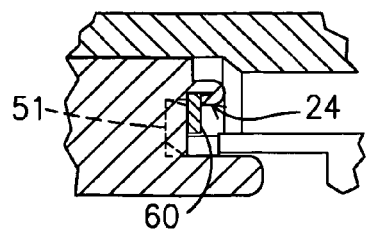
*Fig. 8E*

QUICK TWIST CONNECTOR FOR MARINE BATTERY

The present invention relates generally to battery cable clamps and connectors, and more particularly to a quick twist connector suitable for use with marine batteries, which are typically recognized by their threaded battery posts.

BACKGROUND ART

It will be appreciated by those skilled in the art that most motor boats are now started by battery power utilizing a relatively standardized 12-volt battery having threaded metal posts for the opposing polarities of the battery to which connector cables are attached. Marine-type batteries with threaded posts are used in a number of other applications, and those typically heavy duty, deep cycle applications such as over-the-road trucks, fire trucks and buses, construction equipment, and RV-motor coaches. The standard connection to the battery terminal posts of a marine-type battery involves simply a battery cable having an end lug with an aperture that fits over the battery terminal post. A nut or wing nut is then fastened on the threaded post to hold the lug in place.

Many marine batteries will last for several years, especially when used sparingly as in some boats and vehicles. During the course of the life of a battery, corrosion buildup may occur and cause the bolt or nut to attach by corrosion to the battery post. For this reason, some marine battery components are made of brass or stainless steel. Nonetheless, corrosion may impair the proper transmission of battery power from the battery post through the lug to the battery cable thereby diminishing the electrical power available. To remedy the diminished transmission of power, the battery cable clamp and nut or bolt have to be removed, corrosion brushed away, and then replaced so that a solid connection between the lug and the post can be reestablished. In addition, batteries must often be disconnected for proper servicing of a vehicle and if the battery is spent, the old battery must be removed and replaced with a new one. In light of these circumstances, the securing nut or bolt must be removed and the seal of corrosion broken to remove the nut and lug from the post. Because of the corrosion of the nut or bolt to the threaded battery post, any of the processes of disconnecting and reconnecting power, cleaning the battery post, or replacing the battery can be time consuming and difficult.

The difficulties of removing a nut or bolt in confined space make it particularly desirable that a wing nut type fastener be utilized so that it is not frequently necessary to work with a wrench in restricted spaces. It is also desirable that the nut or bolt be removed with a small number of turn for reasons of speed and convenience. There are similar difficulties in threading a bolt in confined spaces, so that a self-setting fastener is preferred. In some situations, the threaded section of a bolt may be very long, and it is desirable to have a fastener that can slide over the threads and then be set where desired.

What is needed then, is a fastener that will overcome the problems with prior art devices and provide an easily removable and fastenable connector to hold the battery lug in place on a marine battery. In addition, on marine batteries it is common to utilize battery terminal covers to protect terminal connections from accidental shorts. Therefore, a connector that provides some degree of insulation may reduce the need for such additional insulating components.

SUMMARY OF THE INVENTION

Instead of a standard bolt or wing nut which attaches to a threaded marine battery post in a conventional manner, the split wing nut assembly of the present invention is able to fit around the threaded terminal post until only the last several turns of the thread required to securely fasten the battery cable lug onto the post. The split wing nut assembly is compressed as downward pressure forces left and right split nut portions together and then several turns of the winged sleeve cause the left and right nut portions to completely tighten the split wing nut assembly against the battery cable lug on the post. Similarly, when it is desired to remove the battery cable, only a few turns of the wing nut sleeve are required to create sufficient space for the left and right nut sections to separate and then move freely over the threaded battery post permitting rapid removal of the split wing nut assembly and the battery cable lug it was holding in place. The upper portion of the wing sleeve may be manufactured with an insulating coating, or in appropriate cases of insulating materials such as glass filled Nylon, to protect against some instances of accidental shorting. In addition, the sleeve encompassing the left and right nut sections may be formed of an insulating material. To realize a self-setting fastener, it is preferred that only one of the split nut portions be threaded. In this fashion, cross-threading is eliminated.

BRIEF DESCRIPTION OF THE DRAWINGS

These and other objects of the invention will be explained in greater detail in connection with the following drawings of the preferred embodiment of the invention:

FIG. 1 is an exploded perspective view of the elements of a split wing nut battery cable fastener of the present invention.

FIG. 8A is a perspective view of an assembled split wing nut according to the present invention.

FIG. 8B is a bottom plan view of the split wing nut fastener of FIG. 8A.

FIG. 8C is a side sectional view of the split wing nut fastener of FIG. 8A taken along the line C-C in FIG. 8B.

FIG. 8D is an enlarged view of the portion D marked in FIG. 8C.

FIG. 8E is an enlarged view of the portion E marked in FIG. 8C.

DETAILED DESCRIPTION OF THE INVENTION

A description of the preferred embodiment of the present invention will be best understood by referring to FIGS. 1-9 of the accompanying drawings wherein like numerals refer to like parts.

Figure 9:
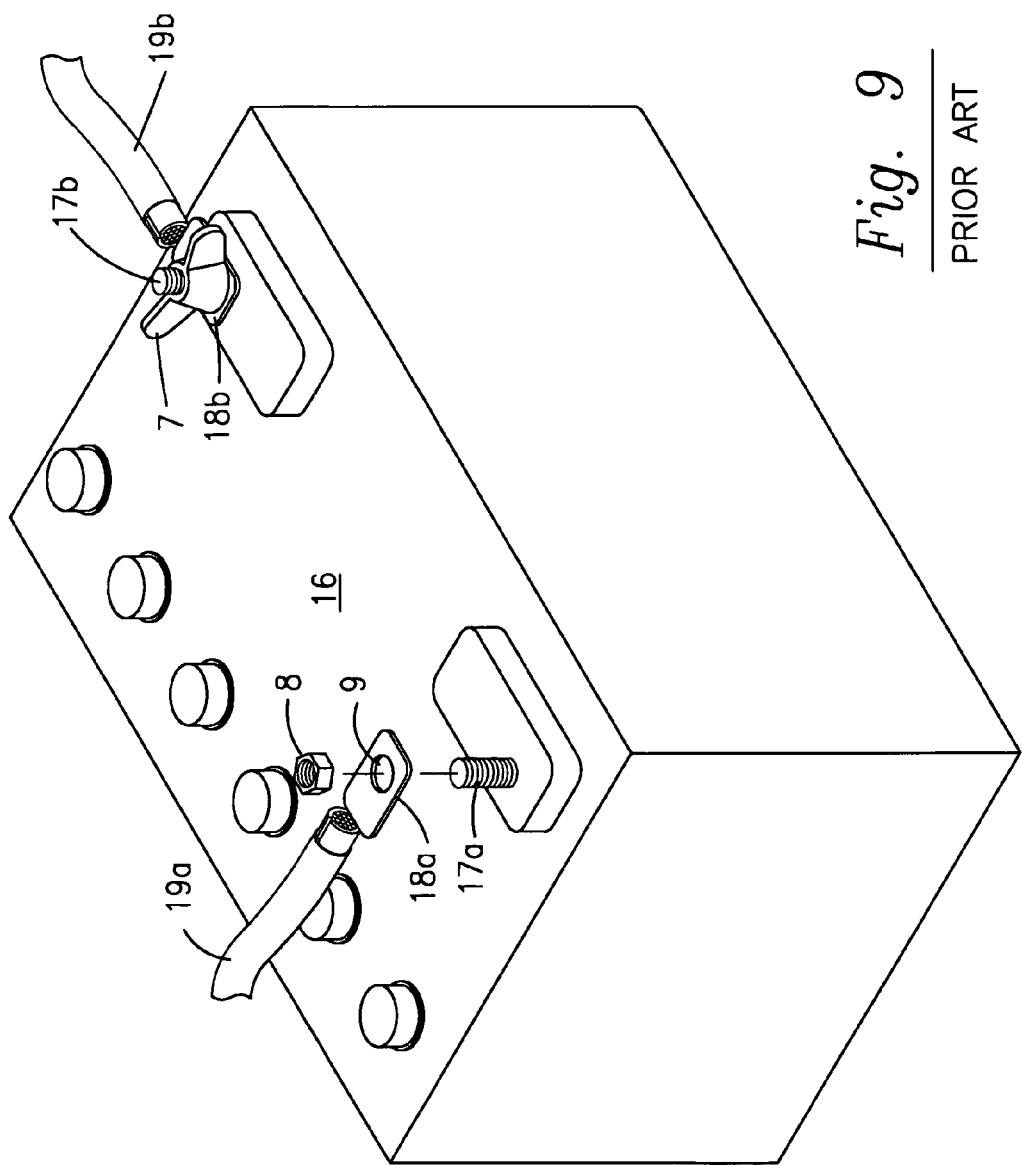
FIG. 9 is a perspective view of prior art fasteners utilized on the threaded terminals of a typical marine battery.
Figure 10:
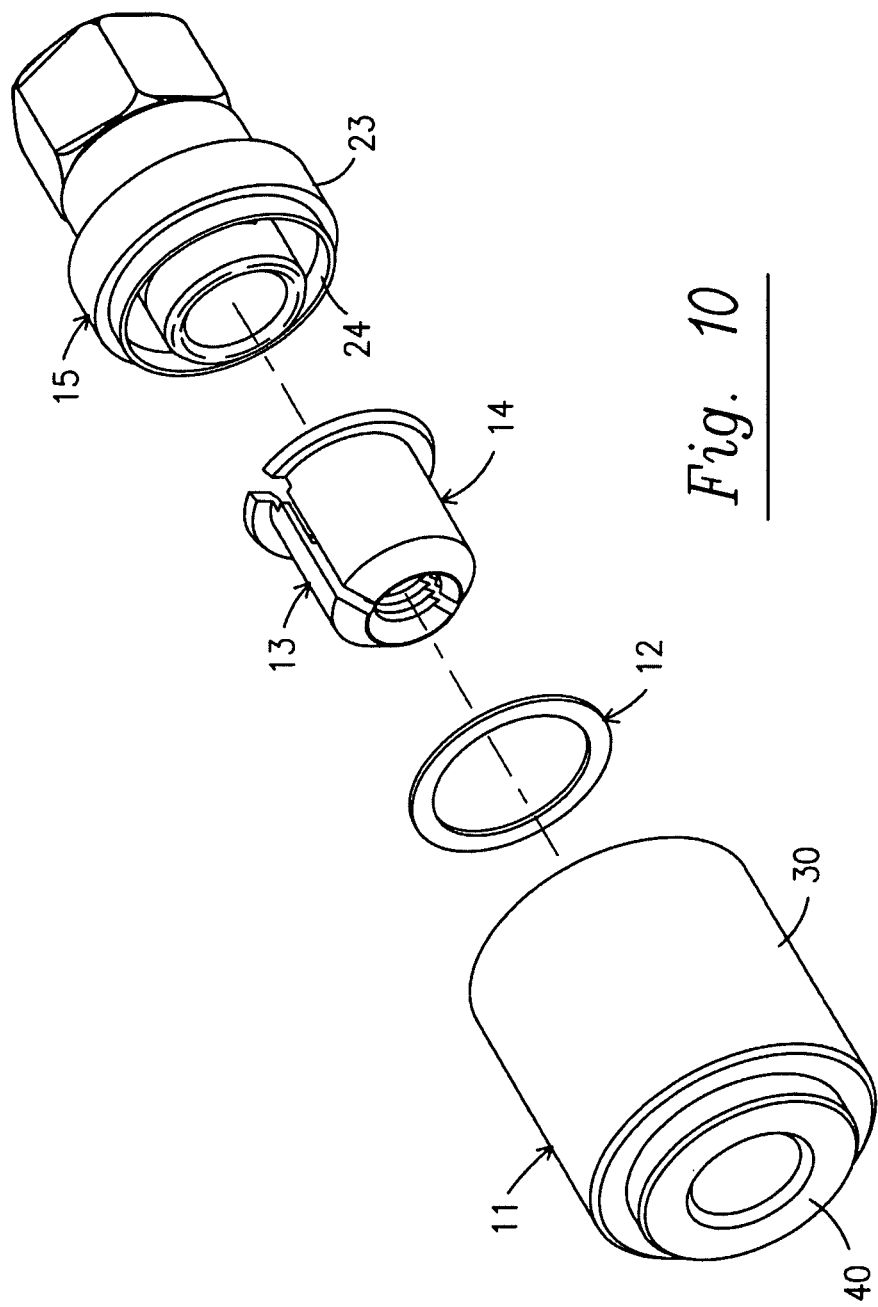
FIG. 10 is an exploded perspective view of the elements of a split nut battery cable fastener of the present invention with a six-sided nut shaped grasping portion.

In the prior art as shown in FIG. 9, a typical marine battery 16 is provided with positive and negative battery terminal posts 17a, 17b. In order to fasten battery cables 19a, 19b to create an electrical connection with battery terminal posts 17a, 17b, the battery cables 19a, 19b terminate in a lug portion 18a, 18b, having an opening 9 sized to fit about the battery terminal posts 17a, 17b. A typical marine battery post might be about ⅜ of an inch in diameter with M6 thread. The lugs 18a, 18b are then held in place by fastening a nut 8 or wing nut 7 type fastener on the threads of terminal posts 17a, 17b. These prior art fastening devices are unnecessarily slow, subject to binding due to corrosion, difficult to set on the threads of the posts 17a, 17b without cross-threading, and in confined spaces difficult to manipulate with a wrench, all the while providing no insulating protection against accidental short circuits. To provide insulation, it is common in the prior art to utilize additional insulating boots to cover the terminal posts 17a, 17b and fasteners 8,7.

Accordingly, according to the present invention, a split wing nut assembly is provided, shown in its assembled form in FIG. 8 and in exploded view in FIG. 1. The components of the illustrated split wing nut fastener include retaining sleeve 11 formed of sleeve cylinder 30 and sleeve cap 40, retaining ring 12, threaded left nut section 13 and unthreaded right nut section 14 and wing sleeve 15. These components are shown in isolation in greater detail in the following drawings.

Figure 2A:
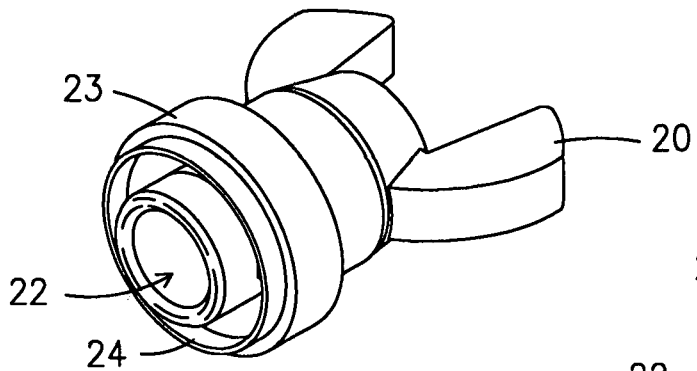
FIG. 2A is a perspective view of the winged sleeve of the split wing nut of the FIG. 1.
Figure 2B:
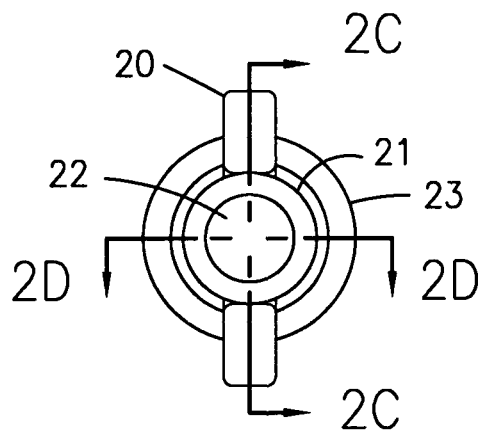
FIG. 2B is a top plan view of the split wing nut of FIG. 2A.
Figure 2C:
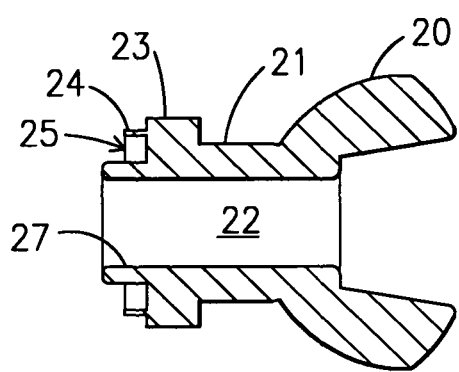
FIG. 2C is a side sectional view of the split wing nut of FIG. 2A taken along the line C-C as shown in FIG. 2B.
Figure 2D:
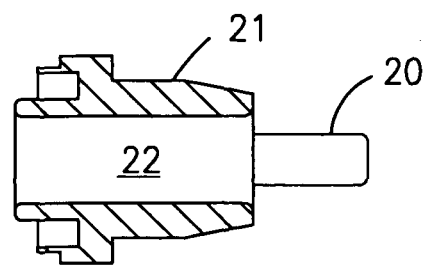
FIG. 2D is a side sectional view of the split wing nut of FIG. 2A taken along the of FIG. 2B.
Figure 2E:
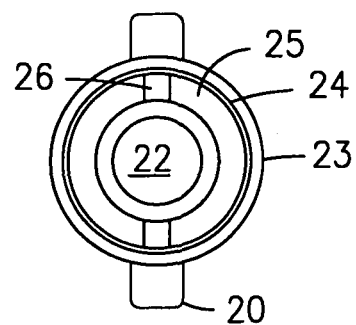
FIG. 2E is a bottom plan view of the split wing nut of FIG. 2A.

FIG. 2A shows the wing sleeve 15 with a grasping portion such as wings 20, a body such as cylindrical wall 21 which has an expanded wall portion 23 with a downwardly extending flange 24 defining an interior channel 25 between flange 24 and the distal section 27 of body 21. Keys 26 protrude into the channel 25. The cylindrical wall 21 defines an interior channel or lumen 22 which is of a dimension suitable to permit the unimpeded passage of a marine battery terminal post, or even a longer threaded bolt that might pass entirely through the split nut assembly. The grasping portion may be advantageously coated with a durable insulating material such as glass filled Nylon, or other polymers, thereby avoiding the need for an insulating boot to cover the terminal post, especially when the sleeve cylinder 30 is also insulated or made from an insulating material.

Figure 3A:
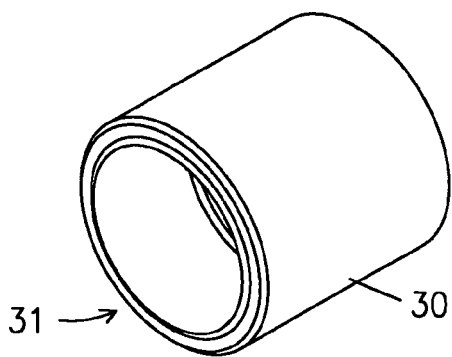
FIG. 3A is a perspective view of the sleeve cylinder of the retaining sleeve shown in FIG. 4A.

FIG. 3A depicts the sleeve cylinder 30 which has an interior channel 31, a slightly raised interior edge 34 at the top, the interior channel 31 having a slightly wider portion 32 toward the top, a narrower portion 33 as the channel proceeds downward, and an inwardly turned lip 35.

Figure 4A:
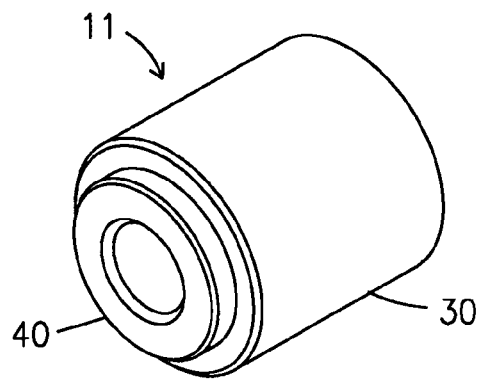
FIG. 4A is a perspective view of the retaining sleeve of FIG. 1 shown in isolation.
Figure 3B:
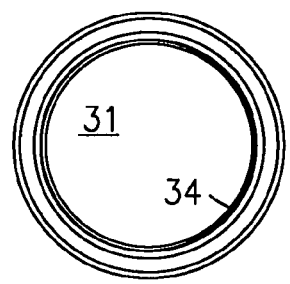
FIG. 3B is a top plan view of the sleeve cylinder of FIG. 3A.
Figure 4B:
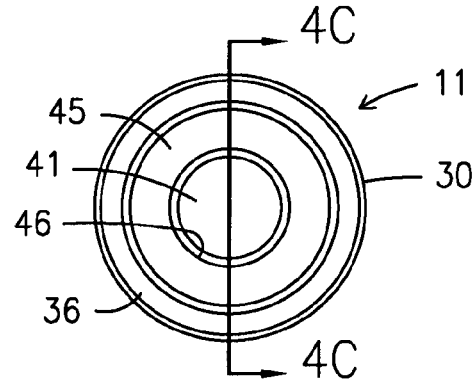
FIG. 4B is a bottom plan view of the retaining sleeve of FIG. 4A.
Figure 3C:
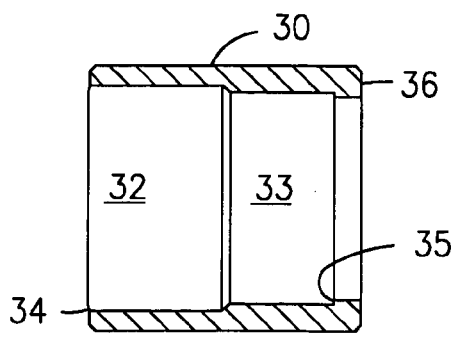
FIG. 3C is a side sectional view of the sleeve cylinder of FIG. 3A taken along the line C-C of FIG. 3B.
Figure 4C:
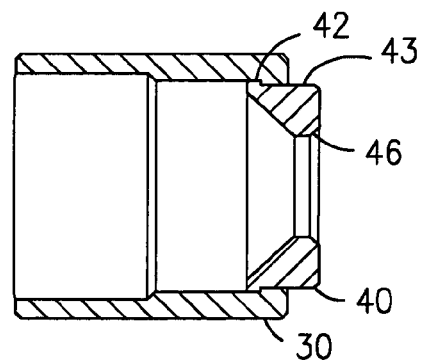
FIG. 4C is a side sectional view of the retaining sleeve of FIG. 4A taken along the line C-C of FIG. 4B.

FIG. 4A shows the retaining sleeve 11 which comprises the sleeve cylinder 30 and sleeve cap 40. The upper portion of sleeve cap 40 has flange 42 which will not pass through the inward lip 35 of sleeve cylinder 30 as shown in FIG. 4C. Thus, a portion of side wall 43 of sleeve cap 40 extends beyond sleeve cylinder 30, and the bottom 45 of sleeve cap 40 has an opening 41 with a tapered edge 46 to assist in guiding a battery terminal post into the opening 41. Thus, the tapered edge 46 slopes rearward toward the opening 41.

Figure 5A:
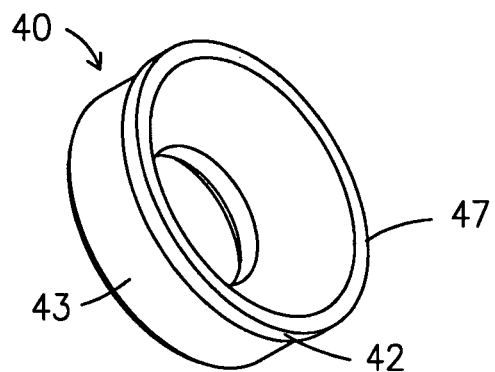
FIG. 5A is a perspective view of the sleeve cap shown fitted at the end of the sleeve cylinder in the retaining sleeve of FIG. 4A.

FIG. 5A shows the sleeve cap 40 in isolation and particularly the outer flange 42 with upper outer surface 47 and tapered inner surface 44 defining opening 41. The sleeve cap 40, like the wing sleeve 15, is preferably made of stainless steel or other strong non-corrosive material.

Figure 6A:
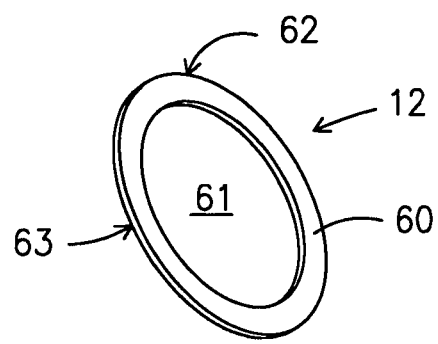
FIG. 6A is a perspective view of the retaining ring shown in FIG. 1.
Figure 5B:
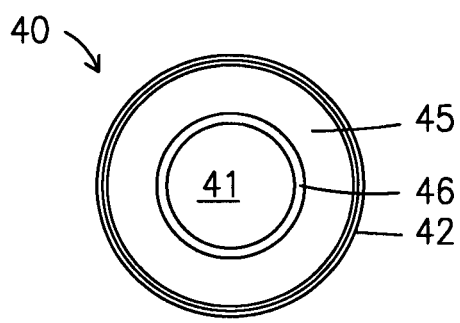
FIG. 5B is a bottom plan view of the sleeve cap of FIG. 5A.
Figure 6B:
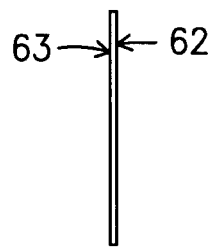
FIG. 6B is a side plan view of the retaining ring of FIG. 6A.
Figure 5C:
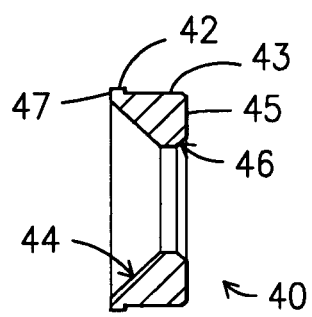
FIG. 5C is a side sectional view of the sleeve cap of FIG. 5A taken along the line C-C of FIG. 5B.
Figure 6C:
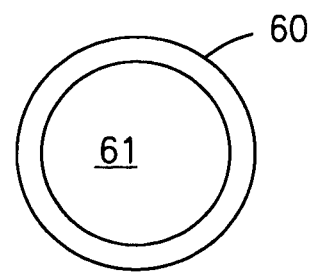
FIG. 6C is a top plan view of the retaining ring of FIG. 6A.
Figure 7A:
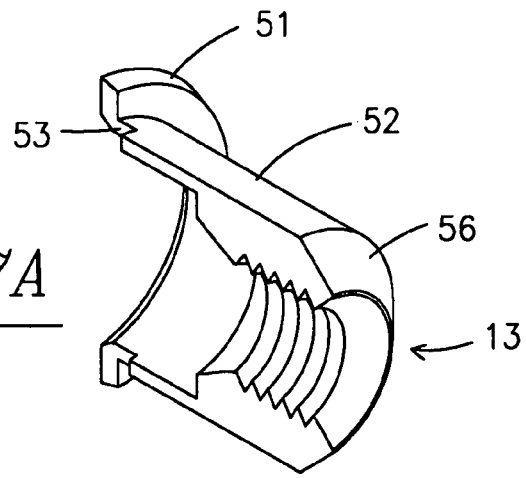
FIG. 7A is a perspective view of a threaded nut section of the winged nut fastener shown in FIG. 1.
Figure 7B:
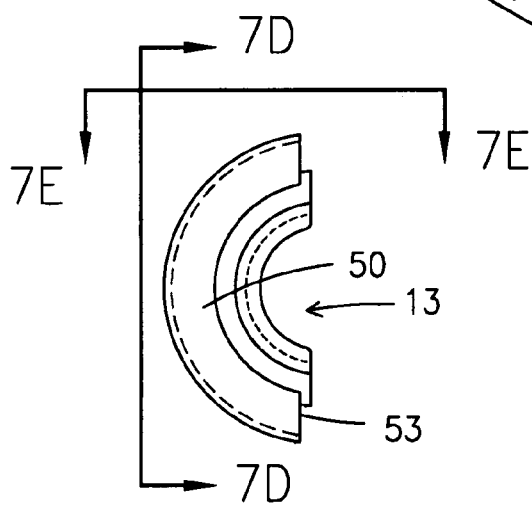
FIG. 7B is a top plan view of the nut section of FIG. 7A.
Figure 7C:
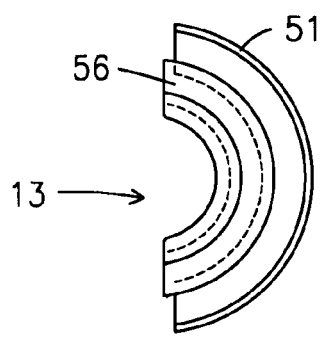
FIG. 7C is a bottom plan view of the nut section of FIG. 7A.
Figure 7D:
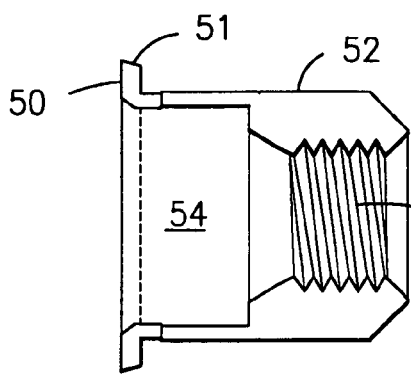
FIG. 7D is a side plan view of the nut section of FIG. 7A taken along the line D-D in FIG. 7B.
Figure 7E:
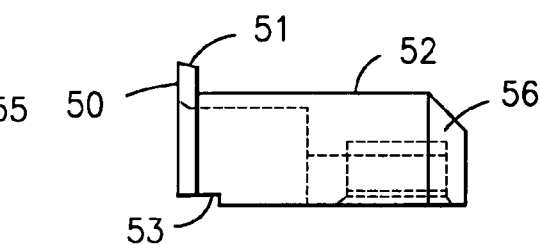
FIG. 7E is a side plan view of the nut section of FIG. 7A taken along the line E-E in FIG. 7B.

FIG. 6A shows the retaining ring 12 comprising band 60 having an opening 61, top surface 62 and bottom surface 63.

FIG. 7 shows nut section 13 which is substantially the same angular size as nut section 14 in the illustrated embodiment, although it would be possible for one of the nut sections to be larger than the other, or for there to be more than two nut sections, for instance three sections of approximately 120° of curvature each rather than the illustrated two sections each of approximately 180° curvature. The nut section 13 has a top surface 50, an upper flange 51, body 52 with an inward notch toward the top, and a tapered bottom outer surface 56 generally matching the taper on the top surface 44 of sleeve cap 40. The inner portion of body 52 has an upper wider cavity portion 54 and extends downward to threaded cavity portion 55 sized to fit on a standard threaded marine battery terminal post. The other nut section 14, shown in FIG. 1, is preferably substantially identical to nut section 13, except the cavity portion 55 is not threaded. In this fashion, when the nut sections 13,14 engage on the threads of the terminal posts 17a, 17b, there is no possibility of cross-threading causing the nut to jam. Instead, the threads of nut section 13 engage with the threads of the terminal posts 17a, 17b and unthreaded nut section 14 glides smoothly around the post as the nut 10 is tightened.

FIG. 8 shows the assembled split wing nut fastener where it can be seen that the fastener is assembled by placing sleeve cap 40 within sleeve cylinder 30, and if desired some adhesive may be utilized between flange 42 and lip 35 to securely hold sleeve cap 40 in its position at the bottom of sleeve cylinder 30. Next, the wing sleeve split nut assembly is created by sliding the nut sections 13, 14 within the opening 61 of retaining ring 12 until the top surface 62 of band 60 is beneath the flange 51 of the half nut sections 13, 14. Then, the retaining ring 12 and half nut sections 13, 14 are fit into the channel 25 (shown in FIG. 2C) between the lower section 27 of cylinder wall 21 and flange 24 of the wing sleeve 15. Flange wall 24 is bent around the outside of band 60 and over a portion of the bottom surface 63 of the band 60, as shown in FIG. 8E, thereby clamping the band and nut section flange 51 securely into channel 25. Due to notch back 53 at the top of nut sections 13, 14, openings exist along the top surface 50 of the nut sections and detents such as key ridges 26 within channel 25 engage those open sections so that the half nut sections 13, 14, rotate in unity with wing sleeve 15. The final assembly step involves the rolling of edge 34 on the interior of sleeve cylinder 30 inward creating an inwardly facing flange so that the expanded cylinder wall 21 of the body portion of wing sleeve 15 will not exit from the sleeve cylinder. In order to provide some insulating protection, preferably at least the grasping portion of wing sleeve 15 is insulated, either by manufacture with insulating material or by coating with an insulating material. For instance, the wing sleeve 15 could be manufactured substantially from glass-filled Nylon and then be attached to a lower metal fitting defining flange 24 and channel 25. Alternatively, the wing sleeve 15 can be made of metal and at least the grasping portion such as wings 20 can be coated with polyimide resin or other insulating material. In some embodiments, the grasping portion may be adapted to be turned with a tool, such as being adapted to the configuration of a six-sided nut for turning with a wrench.

In operation, the opening 41 in the sleeve cap and lumen 22 in the wing sleeve are slightly larger than a standard threaded marine battery terminal post. Indeed, even the cavities 55 of nut sections 13, 14 are spaced apart by more than the diameter of such a threaded terminal post. However, when downward pressure is exerted upon the wing sleeve 15, the lower tapered bottom section 56 of nut portions 13, 14 are pressed against the tapered surface 44 of the sleeve cap. This causes the forward portions of the nut sections to pivot inward whereby the threaded portion 55 of nut portion 13 engages with threads on a threaded marine battery terminal post. Once the threaded section 55 has engaged, further tightening may only be accomplished by twisting the grasping portion of wing sleeve 15. Tightening has the effect of both pulling the entire split nut wing fastener and the bottom 45 of sleeve cap 40 downward against a cable lug to ensure good contact between the cable lug and the terminal, and the additional effect of urging the nut sections 13, 14 more firmly against the interior tapered surface 44 of sleeve cap 40 so that nut portions 13, 14 are securely engaged against the threads of the terminal post 17a, 17b. In operation, on a typical M6 thread terminal post, it is generally only necessary to turn the wing sleeve through a rotation of between about 180° to 360° in order to accomplish secure tightening of the split nut wing fastener.

Use of the fastener is not limited to marine battery terminal posts, as it may also be adapted to use on almost any threaded post for electrical or mechanical connections. Indeed, one significant use is to place a split nut fastener on a long threaded bolt, whereby the fastener may be moved freely along the bolt without spinning until the split nut sections are pushed forward and pivot inward. Once the split nut sections engage, the fastener is quickly tightened. Thus a quick connect fastener is provided.

Accordingly, the present invention provides quick connect and disconnect capability in a confined space with a grasping portion that often obviates the use of a wrench even in the presence of limited corrosion. If a wrench should be necessary, only a single turn of the fastener may be required in order to disengage the fastener from the terminal post. Furthermore, this invention provides a self-setting nut and may obviate the need for a separate insulating boot over the terminal.

Although preferred embodiments of the present invention have been disclosed in detail herein, it will be understood that various substitutions and modifications may be made to the disclosed embodiment described herein without departing from the scope and spirit of the present invention as recited in the appended claims.

We claim:

1. A split nut battery cable connector comprising:
a distal grasping portion extending forward to a body having a longitudinal lumen and engaging a plurality of forward extending nut sections;
at least one of said nut sections having a forward threaded interior surface;
said nut sections being spaced apart from one another and having forward exterior frustoconically tapered exterior surfaces;
said nut sections being further constrained within a sleeve for reciprocal movement along the axial orientation of the body lumen;
the front of the sleeve having a sleeve retainer with an opening and an interior surface sloping forward toward the opening;
such that when the body is moved forward within the sleeve the nut sections are urged toward one another and
wherein the distal grasping portion comprises a pair of wings.

2. A split nut battery cable connector comprising:
a distal grasping portion extending forward to a body having a longitudinal lumen and engaging a plurality of forward extending nut sections;
at least one of said nut sections having a forward threaded interior surface;
said nut sections being spaced apart from one another and having forward exterior frustoconically tapered exterior surfaces;
said nut sections being further constrained within a sleeve for reciprocal movement along the axial orientation of the body lumen;
the front of the sleeve having a sleeve retainer with an opening and an interior surface sloping forward toward the opening;
such that when the body is moved forward within the sleeve the nut sections are urged toward one another, wherein the distal grasping portion is electrically insulated.

3. A split nut battery cable connector comprising:
a distal grasping portion extending forward to a body having a longitudinal lumen and engaging a plurality of forward extending nut sections;
at least one of said nut sections having a forward threaded interior surface;
said nut sections being spaced apart from one another and having forward exterior frustoconically tapered exterior surfaces;
said nut sections being further constrained within a sleeve for reciprocal movement along the axial orientation of the body lumen;
the front of the sleeve having a sleeve retainer with an opening and an interior surface sloping forward toward the opening;
such that when the body is moved forward within the sleeve the nut sections are urged toward one another wherein a proximal end of the body engages two forward extending nut sections and the proximal end defines a channel that receives a distal top surface of each of the two forward extending nut sections.

4. The split nut battery cable connector of claim 3 wherein the channel has a key located between each of the distal top surfaces of the two forward extending nut sections.

5. A split nut battery cable connector comprising:
a distal grasping portion extending forward to a body having a longitudinal lumen and engaging a plurality of forward extending nut sections;
at least one of said nut sections having a forward threaded interior surface;
said nut sections being spaced apart from one another and having forward exterior frustoconically tapered exterior surfaces;
said nut sections being further constrained within a sleeve for reciprocal movement along the axial orientation of the body lumen;
the front of the sleeve having a sleeve retainer with an opening and an interior surface sloping forward toward the opening;

such that when the body is moved forward within the sleeve the nut sections are urged toward one another wherein an exterior surface of the sleeve retainer slopes rearward toward the opening.

6. A split nut battery cable connector comprising:
a distal grasping portion extending forward to a body having a longitudinal lumen and engaging a plurality of forward extending nut sections;
at least one of said nut sections having a forward threaded interior surface;
said nut sections being spaced apart from one another and having forward exterior frustoconically tapered exterior surfaces;
said nut sections being further constrained within a sleeve for reciprocal movement along the axial orientation of the body lumen;
the front of the sleeve having a sleeve retainer with an opening and an interior surface sloping forward toward the opening;
such that when the body is moved forward within the sleeve the nut sections are urged toward one another and wherein at least the exterior surface of the sleeve is electrically non-conductive.

7. A split nut battery cable connector comprising:
a body sleeve having a distal grasping portion and a longitudinal lumen and extending forward to a proximal end having a channel therein encircling an opening of the lumen at the proximal end;
a first nut section having a distal end engaged in the channel, said nut section having a forward interior surface that is unthreaded;
a key located at each side of the distal end of said first nut section;
a second nut section having a distal end received in said channel, said second nut section having a forward threaded interior surface;
said first and second nut sections having forward frustoconically tapered exterior surfaces;
said nut sections being inserted into a sleeve having a front end with an opening and an interior surface sloping forward toward the opening;
said body sleeve being rotatable relative to the sleeve; and
wherein said nut sections and at least a portion of the body sleeve are constrained within the sleeve for reciprocal movement along the axial orientation of the lumen of said body sleeve and the nut sections rotate in unity with rotation of the body sleeve relative to the sleeve.

8. A split nut battery cable connector comprising:
a distal grasping portion extending forward to a body engaging a plurality of forward extending nut sections, wherein a longitudinal lumen passes through the body and grasping portion;
at least one of said nut sections having a forward threaded interior surface;
said nut sections being spaced apart from one another and having forward exterior frustoconically tapered exterior surfaces;
said nut sections being further constrained within a sleeve for reciprocal movement along the axial orientation of the longitudinal lumen; and
the front of the sleeve having a front wall with an opening and an interior surface sloping forward toward the opening
such that when the distal grasping portion is moved forward relative to the sleeve, the nut sections are moved toward one another about the threaded rod, wherein the distal grasping portion comprises a six-sided nut shape.

9. The split nut battery cable connector of claim 7 wherein the distal grasping portion comprises a pair of wings.

10. A split nut battery cable connector comprising:
a distal grasping portion extending forward to a body engaging a plurality of forward extending nut sections, wherein a longitudinal lumen passes through the body and grasping portion;
at least one of said nut sections having a forward threaded interior surface;
said nut sections being spaced apart from one another and having forward exterior frustoconically tapered exterior surfaces;
said nut sections being further constrained within a sleeve for reciprocal movement along the axial orientation of the longitudinal lumen; and
the front of the sleeve having a front wall with an opening and an interior surface sloping forward toward the opening
such that when the distal grasping portion is moved forward relative to the sleeve, the nut sections are moved toward one another about the threaded rod, wherein the distal grasping portion comprises a pair of wings.

11. The split nut battery cable connector of claim 7 wherein the distal grasping portion is electrically insulated.

12. A split nut battery cable connector comprising:
a distal grasping portion extending forward to a body engaging a plurality of forward extending nut sections, wherein a longitudinal lumen passes through the body and grasping portion;
at least one of said nut sections having a forward threaded interior surface;
said nut sections being spaced apart from one another and having forward exterior frustoconically tapered exterior surfaces;
said nut sections being further constrained within a sleeve for reciprocal movement along the axial orientation of the longitudinal lumen; and
the front of the sleeve having a front wall with an opening and an interior surface sloping forward toward the opening
such that when the distal grasping portion is moved forward relative to the sleeve, the nut sections are moved toward one another about the threaded rod, wherein the distal grasping portion is electrically insulated.

13. The split nut battery cable connector of claim 7 wherein at least the exterior surface of the sleeve is electrically non-conductive.

14. A split nut battery cable connector comprising:
a distal grasping portion extending forward to a body engaging a plurality of forward extending nut sections, wherein a longitudinal lumen passes through the body and grasping portion;
at least one of said nut sections having a forward threaded interior surface;
said nut sections being spaced apart from one another and having forward exterior frustoconically tapered exterior surfaces;
said nut sections being further constrained within a sleeve for reciprocal movement along the axial orientation of the longitudinal lumen; and
the front of the sleeve having a front wall with an opening and an interior surface sloping forward toward the opening
such that when the distal grasping portion is moved forward relative to the sleeve, the nut sections are moved toward one another about the threaded rod, wherein at least the exterior surface of the sleeve is electrically non-conductive.

15. A split nut battery cable connector comprising:
- a distal grasping portion extending forward to a body having a longitudinal lumen and engaging a plurality of forward extending nut sections;
- at least one of said nut sections having a forward threaded interior surface;
- said nut sections being spaced apart from one another and having forward exterior frustoconically tapered exterior surfaces;
- said nut sections being further constrained within a sleeve for reciprocal movement along the axial orientation of the body lumen;
- the front of the sleeve having a sleeve retainer with an opening and an interior surface sloping forward toward the opening;

such that when the body is moved forward within the sleeve the nut sections are urged toward one another and wherein the nut sections rotate in unity with the rotation of the distal grasping portion relative to the sleeve.

16. The split nut battery cable connector of claim 7 wherein the body sleeve is axially moveable relative to the sleeve.

17. The split nut battery cable connector of claim 6 wherein a rear portion of the sleeve has an inwardly facing flange to constrain the body within the sleeve.

18. The split nut battery cable connector of claim 12 wherein a rear portion of the sleeve has an inwardly facing flange to constrain the body within the sleeve.

19. The split nut battery cable connector of claim 14 wherein a rear portion of the sleeve has an inwardly facing flange to constrain the body within the sleeve.

20. The split nut battery cable connector of claim 14 wherein a proximal end of the body engages two forward extending nut sections.

\* \* \* \* \*